8744½X
A. & B. Darling,
Water Wheel.
Patented Apr 3, 1835.
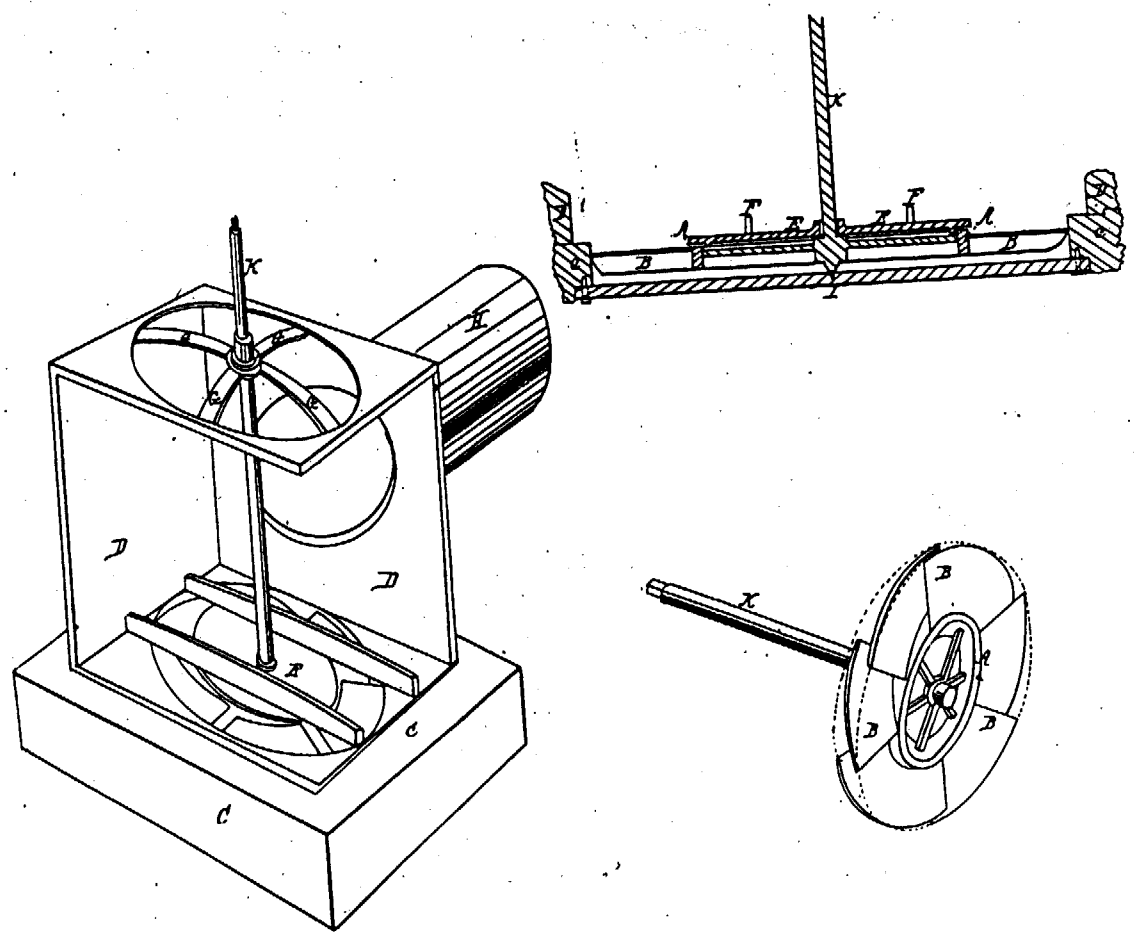

Alvin Darling and Barton Darling 8744 1/2X

Letters Patent.

The Schedule referred to in these Letters Patent and making
part of the same, containing a description in the words of the said
Alvin Darling and Barton Darling themselves of their improve=
ment in Water Wheels for moving Mill works. Machinery &c:

To all to whom these these presents shall come, be it known
that we Alvin Darling and Barton Darling both of Bellingham
in the County of Norfolk and State of Massachusetts have in=
vented a new and useful improvement in Water wheels for
moving Mill works, Machinery and other things by water power,
and that the following is a full and exact description of the con=
struction and operation of the said water wheel as invented
or improved by us. We call our improved wheel, the upright
perpendicular pressure wheel with spiral floats. It is con=
structed and used in the manner hereinafter described.
First, there is an upright shaft which may be either cast or wrought
iron, though we prefer to have the shaft of wrought iron, The
shaft should be of a length adapted to the place where it is to be
used, and of strength proportioned to the weight which is
to be put upon the wheel. The lower end of the shaft must be
fixed to revolve upon a step or bearing. There is to be a cast
iron rim connected with the lower end of the shaft by arms
of cast iron. This rim and the arms may be all cast together,
and if the lower end of the shaft where the arms are to be fastened
were square, and a square orifice like a Mortice just fitted to
that part of the shaft were made in the casting of the centre
where the arms rest, the rim and shaft would be easily con=
nected. The rim and arms may also be cast in parts & bolted
together, and bolted to the shaft to suit the conveniency of the 8744 1/2X the maker. The length and number of the arms and their size and
the thickness and depth of the rim must be adapted to the size
and to the strength required in the wheel, and the depth of the
rim will also; as will be seen hereafter vary to suit the speed
required of the wheel, the quantity of water proposed to be
used by it, and the head from which the water is to be taken
Upon the outside of the rim are to be bolted cast iron floats, these
floats when connected with the rim represent precisely the
threads of a screw, that is the float should be so shaped that
each one when connected with & bolted to the rim would re-
present a portion of the thread of a large screw of which the rim
would represent the body. This gives the floats themselves
what we call their spiral shape. The upper end of each float or
should be in the same plane with the upper edge of the rim, and the
lower end of each float in the same plane with the lower edge of
the rim. The floats should lap over each other somewhat. The
upper end of each float should lap over or pass by the lower end
of the float next to it. The distance which they pass each other
on the rim may equal about twice the distance between them.
The length of the floats must be governed by the number. If only
one were used it must be long enough to go round the rim and lap
a little at the two ends. The distance between the floats too de-
pends upon the number to be applied to any given rim. This number
and their width must be proportioned to the quantity of water to
be used, the head from which it is to be drawn and the speed required
of the wheel. We find the following proportions answer very well in
practice viz. with an eight feet head to have a wheel three feet
in diameter including the floats, to have the depth of the rim three
and an half inches, to have the number of floats six, the width of
the floats eight inches, this wheel will revolve one hundred
and fifty times per minute and with force sufficient to carry
a corn mill, if greater speed were required it may be obtained
by increasing the depth of the rim or by increasing either the number

8744X crooked so as to conform to the rim in which the floats re-
volve. The rim attached in the model to the platform re-
presents the proportional thickness of the platform, and
then the cap piece might have been straight. This was con-
structed so that the model might be as light as possible.
Another and very important appendage to our wheel is, the
stationary cap which keeps the water from pressing upon
any part of it except the floats. This cap should be of cast
iron— a circular plate of sufficient thickness to be strong,
equal in diameter to the exterior diameter of the rim of the
wheel to which the floats are bolted, and as it lies over the
wheel should not project at all over the floats. On the lower
side of this cap there should be a circular flange to correspond
as near as possible with the inside of the rim of the wheel.
The flange and cap should set as close as possible to the
rim of the wheel without friction to prevent the escape of
water. This cap must be supported by two cross bars fastened to
the upper side of it which bars may be iron or wood, but we think
them better to be made of iron. and may rest and be supported on
the upper side of the platform if that is thick enough; if the plat-
form is not thick enough so that the cap would clear the rim
of the wheel, if the bars were so placed these bars may rest on
blocks secured upon the platform. The pressure of the water on
the cap will keep it in its place when the wheel is in motion.
Upon the platform must be placed and framed a square flume
of sufficient diameter to enclose the wheel and its appendages.
This flume may be of the same height with the head of water,
and the shaft of the wheel may at the top pass through and turn
in and be confined by a cross bar or breech tree crossing the top
of the flume. On the top of the shaft may be fastened a coupling
block, a gear or a drum to communicate the motion to works to
which the wheel is to be applied. The shaft passes through the cap
and must be as tight in the cap as it can be without occa-
sioning

8744X number or the width of the floats. Either of these changes will
occasion the use of more water under the same head. The grea
is the depth of the rim, and the greater too is the number of the flo
and the greater is the width of the floats, the greater is the spee
of the wheel while of the same diameter, and the greater is the
quantity of water used under the same head; Under a greate
head the same power can be obtained with narrower rim and
narrower floats. We believe for practical purposes our wheel
answers best when from two to four feet diameter including the
floats, but the same principles will apply to larger or smaller
wheels. We think the width of the floats should equal about on
fifth of the diameter of the whole wheel, and the depth of the rim
should equal about one tenth of the same diameter. With these pro-
portions the number of the floats may be adapted to the head of
water and the speed required. We think too that when a large
power is wanted it is better to have two smaller wheels con-
structed according to our plan than one very large one and we
should call a very large one, one much more than four feet in diam-
eter. The wheel should be let into a wooden platform a very
little thicker than the depth of the rim, so that the floats may ru
clear of the cross tree which supports the wheel below and the bar
which support the cap (which will be described hereinafter) abov
This platform must be solid and unyielding, large enough to
support the flume, and the place in it where the wheel revolves
must be just large enough to admit it to revolve freely and at
the same time prevent the escape of the least possible quantity
of water. In this horizontal platform the wheel revolves supported
upon a cross bar or [illegible] tree framed or bolted to the bottom of the
platform. The shaft turns upon a step or bearing fastened to this
cross bar. In the model sent here with the plate intended to
represent the bottom of the flume or the platform is not equal
in thickness to the depth or width of the rim of the wheel; and
the cross bar supporting the wheel is represented by a bra crooked unnecessary friction. The flume may if that be any improvement be capped over and the water introduced into it by a trough. It is designed that the flume should be empty except when the wheel is in motion and that the wheel should be started by allowing the water to run into the flume. We think the wheel will last best to be so hung that the floats may be always just [illegible] with water. Our wheel if inverted would, if enclosed in a hollow cylinder, well answer the purpose of a very powerful forcing pump.

Witnesses } Bellingham County of Norfolk & State of Massachusetts, Sept. 1st 1834. Alonzo Darling
Nathan beck [illegible] } Barton Darling
[illegible] Pratt }

Drawing)

To all persons to whom these presents shall come. Barton Darling and Alonzo Darling aforesaid would respectfully represent, that they have contemplated the application of the cap used in their wheels afore described to keep the pressure of the water from the arms of their said wheel to other upright wheels for the same purpose, that is for keeping the water from pressing upon the arms of such wheels and impeding their motion. And they have invented such a cap as an improvement in such upright wheels and particularly in the cast iron wheel invented and patented by Russel &... And the application to the said Russel wheel they make in the following manner. The cap is a plate of cast iron circular and just large enough to be admitted into the inside of the said Russel wheel with a hole in the center of the cap large enough to admit the shaft of the wheel to pass through the said cap. The cap should be fitted as closely to the bottom of the wheel as it can be and allow the wheel to revolve without friction, and it must be supported in its place by bolts from cross bars passing across the flume above the wheel. Another application of their said cap. The said Darlings have invented 8744 1/2 X invented which is this. Let the arms of the said Russel wheel be at the top of the same rather than at the bottom, & the shaft be connected with the arms as it would be if they were at the bottom. Then place a cap of cast iron just over the top and as close to the upper edge as possible so as to keep out water from the wheel as entirely as possible & allow the wheel to revolve without friction against the cap, & the shaft of wheel passing through the cap. The cap must then be supported by cross bars of wood or iron passing across the flume. The wheel so covered must then be let into the bottom of the flume in which it is to run. A circular hole is made in the bottom of the flume just large enough to admit the wheel, and the lower edge of the wheel must then be admitted into this hole just enough to prevent the escape of water through this hole except that which comes through the wheel & the orifice should fit the lower edge of the wheel as tightly as possible without friction. The wheel may then run upon a step or bearing resting on a breech tree bolted to the bottom of the flume. The wheel being so placed, the water when let into the flume will pass into the wheel and cause it to revolve and then escape through the bottom.

The said Darlings therefore claim as their invention the cap as applied to their said wheel and its other applications as specified in the foregoing.

Bellingham aforesaid Oct. [illegible] 1834.

Barton Darling
Alonzo Darling

Witnesses
Ellis B. Darling.
Benjamin M. Darling.

2379 words (Patented April 3. 1835)

(Drawing)